United States Patent [19]

Andre et al.

[11] 3,966,996

[45] June 29, 1976

[54] PROCESS FOR PREPARING SPHEROIDAL ALUMINA PARTICLES

[75] Inventors: Jacques Maurice Jules Andre, Brussels; Hugo Johannes van Thillo, Grimbergen; Rene Odon Lammers, Brussels; Henri Robert Debus, Meise; Raymond Marc Cahen, Brussels, all of Belgium

[73] Assignee: Labofina S.A., Brussels, Belgium

[22] Filed: Feb. 10, 1975

[21] Appl. No.: 548,213

[30] Foreign Application Priority Data

Feb. 18, 1974 Luxemburg .............................. 69407

[52] U.S. Cl. ................................. 423/626; 423/625; 423/628; 423/630; 423/631; 252/463; 252/448; 252/465; 252/466 R

[51] Int. Cl.² ........................................... C01F 7/02

[58] Field of Search ........... 423/628, 630, 625, 631, 423/626; 252/448; 264/15

[56] References Cited
UNITED STATES PATENTS

| | | | |
|---|---|---|---|
| 2,672,452 | 3/1954 | Wankat | 252/448 |
| 2,955,915 | 10/1960 | Bicek | 423/630 |
| 3,290,122 | 12/1966 | Clinton et al. | 252/448 |
| 3,353,910 | 11/1967 | Cornelius et al. | 423/628 |
| 3,416,888 | 12/1968 | Notari | 423/628 |
| 3,464,928 | 9/1969 | Mathis | 252/448 |
| 3,558,508 | 1/1971 | Keith et al. | 252/448 |
| 3,600,129 | 8/1971 | Vesely et al. | 252/448 |
| 3,746,659 | 7/1973 | Horzepa | 252/448 |
| 3,758,418 | 9/1973 | Leonard et al. | 423/630 |
| 3,776,987 | 12/1973 | Gumis et al. | 252/448 |

*Primary Examiner*—Herbert T. Carter

[57] ABSTRACT

A process for preparing aluminum oxide beads from alumina hydrogel, comprising polymerizing in a hot and substantially water-immiscible fluid, an aqueous mixture which contains alumina hydrogel and a water soluble monomer whose uncross-linked polymer is water soluble or forms a gel, this mixture being dispersed as droplets into said fluid in which substantial polymerization of said monomer is performed.

13 Claims, No Drawings

PROCESS FOR PREPARING SPHEROIDAL ALUMINA PARTICLES

BACKGROUND OF THE INVENTION

The present invention relates to a process for preparing substantially spheroidal alumina particles. The present invention also relates to a process for preparing catalysts from such alumina particles.

Metallic oxides, and particularly alumina, are widely used in the chemical industry, typically as catalysts, catalyst supports, adsorbing agents, etc. For the most of these applications, these oxides are preferably used in the form of spheroidal particles or beads. Among the main advantages of such beads are better wear and crushing strength. The beads are more regularly distributed into the reactors which results in reducing the pressure drop variations of the reactants passing through the reactors.

Several processes have already been proposed for preparing spheroidal alumina particles. One of such processes consists of dispersing an alumina hydrosol as droplets into a medium wherein gelation occurs, and thereafter, subjecting the beads which are obtained in the form of alumina hydrogel, to one or more aging treatments in order to obtain beads having a suitable mechanical resistance. According to another process, an alumina hydrosol is mixed with an ammonium salt and a synthetic polymer or a natural gum, and the mixture is then dispersed into a water-immiscible medium and thereafter subjected to an aging treatment. However, these processes have the disadvantage of needing a very long treatment time which tends to render them uneconomical. Additionally, alumina beads prepared by some of these processes contain high amounts, even excessive on occasion, of impurities which are undesirable when these beads are used as catalysts or catalyst supports.

An object of the present invention is to provide a new and simple method for preparing spheroidal alumina particles.

Another object of the present invention is to provide a method of preparing spheroidal alumina particles whose catalytic activity is not inhibited by impurities.

A further object of the present invention is to provide a new and simple process for preparing spheroidal alumina particles having a uniform size.

Another object of the present invention is to provide a new and improved process which permits ready preparation of unrough alumina beads having a remarkable resistance.

SUMMARY OF THE INVENTION

The present invention is a process for producing alumina-oxide beads from alumina hydrogel which comprises polymerizing, in a hot and practically water-immiscible fluid, an aqueous mixture comprising an alumina hydrogel and a water soluble monomer whose uncross-linked polymer is water soluble or forms a gel, this aqueous mixture being dispersed in the form of droplets into the hot fluid up to substantial polymerization of the monomer. More particularly, the process of the present invention comprises (a) producing an aqueous mixture comprising an alumina hydrogel and a monomer as hereinabove defined, this aqueous mixture being easily dispersed as droplets into a hot and substantially water-immiscible fluid, (b) substantially polymerizing the monomer contained in each droplet of said aqueous mixture, (c) recovering beads consisting of alumina hydrogel agglomerated by the polymer, and (d) drying and calcining said beads to thereby obtain alumina beads.

Another embodiment of the present process comprises preparing an aqueous mixture containing from 5 to 30% by weight (based on metallic oxide) of alumina hydrogel, 0.25 to 20% by weight of a water soluble monomer with ethylenic unsaturation and whose un-cross-linked polymer is water-soluble or forms a gel, and 0.05 to 2% by weight of a polymerization catalyst, dispersing said aqueous mixture as droplets, into a water-immiscible fluid, having a temperature of between 50° and 105°C, at atmospheric pressure, maintaining said droplets in said fluid until the beads are formed and become hard, and recovering, drying and calcining said beads.

DESCRIPTION OF THE PREFERRED EMBODIMENTS

In the practice of the process of the present invention, alumina hydrogel is used in a finely divided form to ensure an easy dispersion into the starting aqueous medium. Alumina hydrogel may be prepared by any known method, particularly by treating aluminium sulphate with a base, or by hydrolyzing isopropylate or any other aluminium alcoholate, or by treating an alkali aluminate with an acid or with aluminium sulphate. The precipitate obtained is washed with water several times and thereafter optionally, may be dried.

The starting aqueous mixture must remain sufficiently free flowing at room temperature to allow an easy dispersion thereof in the form of droplets into the polymerization mixture. In order to avoid excessive investment and drying costs for the beads obtained by the process, too dilute a solution of the starting aqueous mixture is to be avoided. Preferably, aqueous mixtures are used containing, in a finely divided form, 5 to 30% by weight (based on dried aluminium oxide) of alumina hydrogel. In some cases, alumina hydrogel may have the tendency to become stiffened in the presence of water, this tendency to stiffening depending on the hydrogel type, its preparation method, its degree of purity and on the monomer type. However, this stiffening does not result from a polymerization of the monomer. Stiffening may be avoided or at least inhibited by subjecting the aqueous mixture to a vigorous stirring and/or by adding, as hereinafter described, an acid compound. Aqueous mixtures containing about 7.5 to 20% by weight of alumina hydrogel are preferably employed, but higher proportions may be used, so long as the starting aqueous medium remains free flowing. The term "alumina hydrogel" used herein includes pure alumina hydrogel, and also hydrogels containing a low amount of silica or alkali silicate or similar impurity.

The water soluble monomer whose uncross-linked polymer is water soluble or forms a gel is selected from the group consisting of ethylenically unsaturated compounds comprising acrylic compounds of the general formula

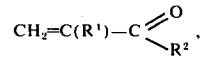

wherein $R^1$ is H or a methyl radical and $R^2$ is a $-OR^3$ or $-NR^3R^4$ radical with $R^3$ and $R^4$ in such radical being H or a hydrophilic radical, particularly a hydroxyalkyl radical containing from 1 to 2 carbon atoms or a methoxy methyl radical. Non-limiting examples of such compounds are acrylic acid, methacrylic acid, acrylamide, methacrylamide, N-hydroxy-methylacrylamide, N-hydroxymethylmethacrylamide, N-methoxymethylacrylamide, N-methoxymethylmethacrylamide, ethyleneglycol monoacrylate, ethylene-glycol monomethacrylate and the like. The choice of the monomers depends primarily on economic conditions and, for that reason, acrylic acid, methacrylic acid, acrylamide and mixtures thereof preferably are used. Reference to water soluble monomer and water soluble uncross-linked polymer also shall include mixtures of ethylenically unsaturated monomers containing a major part of monomers whose uncross-linked polymers are water soluble and a minor part of monomers whose uncross-linked polymers are water-insoluble.

The amount of water soluble monomer used depends on many factors such as alumina hydrogel amount, monomer type, desired apparent density of the final calcined beads, etc. Generally, the amount of such monomer is between 0.25 and 20% by weight of the aqueous mixture. It has been observed that the behavior of beads obtained with the process of the present invention depends on the respective amount of alumina hydrogel and monomer. Preferably, the monomer is used in an amount corresponding to about 5 to 150% of the alumina hydrogel weight (based on oxide). Higher amounts of monomers may induce a disaggregation of the beads when these latter are calcined. Too low an amount of monomer results in beads which are not very manipulatable and firm. In order to obtain beads which present, after calcination, interesting properties with regard to density and mechanical resistance, the aqueous mixtures preferably used contain an amount of monomer corresponding to about 5 to 75% by weight of alumina hydrogel weight (based on oxide).

The starting mixture is dispersed into a substantially water-immiscible fluid, having a temperature between about 50° and 105°C, at atmospheric pressure. Preferably, the aqueous mixture is introduced with the aid of calibrated orifices or nozzles in order to obtain a subdivision of said mixture in the form of droplets which are dispersed into the fluid. The residence time of the droplets in the fluid must be sufficient to permit the polymerization of the monomers. This water-immiscible fluid may be a gas, such as dry air, which is introduced into a tower in counter-current flow to the droplets of the starting aqueous mixture. Another advantageous embodiment of the invention is the using, as such fluid, a water-immiscible liquid. This liquid may have a density higher than that of the beads to be prepared. In such instance, the starting aqueous mixture is introduced as droplets at the bottom of a column containing the liquid and the beads formed and then recovered from the surface of the liquid. Another embodiment consists in using a liquid medium whose density is lower than that of the beads such as a mineral oil. A generally used such technique is described in U.S. Pat. No. 2,620,314. Such technique consists in using a column filled with hot oil in which droplets of the aqueous mixture are let to fall, the residence time of the droplets in the oil being sufficient to allow the polymerization of the polymer. Temperature of the liquid is at least equal to about 50°C, in order to reduce the polymerization time. Temperatures higher than about 105°–110°C result in evaporation of water and a disaggregation of beads unless the process is carried out under pressure.

According to a preferred embodiment, the temperature of the water-immiscible liquid is between 75° and 100°C and the pressure at or near atmospheric pressure.

In order to reduce the time needed for the beads to form, it is advantageous to use means for promoting the polymerization of the monomers. Free radical catalysis techniques with peroxidic compounds are quite useful and particularly useful are the redox catalysis systems which consist of using as catalyst a combination of a peroxidic compound and a reducing agent. Persulphuric acid, hydrogen peroxide, perboric acid and their salts, particularly sodium, potassium or ammonium persulphates and the water-soluble peracids, such as peracetic acid, are examples of useful peroxidic compounds. Reducing agents may be selected from the group consisting of sodium thiosulphate, sodium hydrosulphite or dithionite, sodium or potassium bisulfite, N,N,N',N'-tetramethylethylene-diamine, sodium formaldehydrosulfoxylate, hydrazine, ascorbic acid, etc. A part of the reducing agent may be introduced into the starting aqueous mixture, the other part being added into the water-immiscible fluid in which the polymerization is performed to the extent such reducing agent is soluble in the fluid. It may also be added into the vessel in which the beads are recovered.

The term "polymerization catalyst," as used herein, includes the peroxidic compound when this latter is used with or without reducing agent. The amount of polymerization catalyst can vary widely and it depends on the content of inhibitor present in the monomer used. Generally, the amount of polymerization catalyst is between about 0.05 and 1.5% by weight of aqueous mixture when the monomers are substantially free from inhibitors.

The mixture subjected to polymerization may contain a cross-linking agent which has functional groups so that the polymer chains are linked together and form a three dimensional structure. Cross-linking agents may be 1,3-di(acryl- or methacryl-amidomethyl)-2-imidazolidone, hexahydrotriacryloyltriazine, N,N'-methylidene-bis-acrylamide and alkylidene-bis-acrylamides, such as N,N'-methylene-bis-acrylamide and N,N'-ethylidene-bis-acrylamide when the acrylic monomer used has an amide group, an aldehydic compound may be used as cross-linking agent, such as formaldehyde and glyoxal. Glyoxal reacts with a part of the acrylamide to form N,N'-dihydroxyethylene-bis-acrylamide. It is not necessary to add a cross-linking agent when the acrylic monomers are in an acid medium, but it may be useful to reduce attrition of the beads formed. The amount of cross-linking agent does not generally exceed 1% of the weight of the aqueous mixture although larger amounts may be used, but without any significant advantage.

The starting aqueous mixture must be sufficiently fluid to permit its easy introduction into the medium wherein the polymerization is performed as droplets. However, in certain cases, this mixture tends to become stiffened and then dropwise flow is practically impossible. For instance, by adding acrylic acid to alumina hydrogel, a stiffening may occur with formation of a homogeneous system having some rigidity. It has been found that this problem may be avoided by adding certain acids. Experiments performed on aqueous mixtures of alumina hydrogel, monomers, and catalyst have shown that better results have been obtained when using nitric acid, perchloric acid $HClO_4$ and para-toluenesulphonic acid p—$CH_3C_6H_4SO_3H$. Perchloric acid and nitric acid presents the further advantage of allowing the production of beads having a particularly high mechanical resistance after drying and calcination. The optimum amount of acid eventually used may be readily determined by the skilled worker in the art. The amount of acid depends on the type of alumina hydrogel, on the monomer used and on the desired fluidity of the starting aqueous mixture. Such amount of acid substance can reach and sometimes even exceed 10% of the aqueous mixture weight. In fact, it has been found that perchloric acid may be replaced in an amount up to 50% by another acid such as a halogenated acid, phosphoric acid, an aliphatic mono or dicarboxylic acid, substituted or unsubstituted, and the like. Among the acids which may be used in admixture with perchloric acid, particularly useful are hydrochloric acid, formic acid, acetic acid, oxalic acid, trichloracetic acid and similar such acid, the particular choice of the acid depending primarily on economic conditions.

A preferred embodiment of the present invention as applied to the production of alumina beads which are used as catalysts or catalyst supports, is one comprising using an aqueous mixture containing an alumina hydrogel, a water-soluble monomer as hereinabove defined, a polymerization catalyst, an acid constituent selected from the group consisting of perchloric acid, p-toluenesulphonic or mixtures thereof, and a cross-linking agent. Aqueous mixtures which are more particularly useful comprise 5 to 30% by weight of alumina hydrogel, based on dry oxide, 0.5 to 10% of nitric acid, perchloric acid or para-toluenesulphonic acid, 0.25 to 20% by weight of a monomer of the type hereinabove defined, 0.05 to 2% by weight of a polymerization catalyst, and 0 to 1% of a cross-linking agent. In such mixture, the term "perchloric acid" also includes the mixtures of perchloric acid and the hereinabove discussed acids.

The beads obtained as above described are subjected to a thermal treatment, generally to a drying treatment at a temperature of about 110°C. When used as catalysts or catalyst supports, the beads are calcined by progressively increasing the temperature up to about 400° to 800°C, preferably 500° to 700°C. During this calcination the organic matter contained in the beads is destroyed and beads consisting of firmly agglomerated alumina are obtained. The substantially pure alumina beads obtained after such calcination are characterized by a remarkable hardness and are particularly useful as catalysts or catalyst supports.

The present invention also relates to a process for preparing catalysts in the form of hard beads, these catalysts consisting of alumina impregnated with an active catalytic constituent consisting of a catalytic metallic compound or metal. Any known method may be applied to prepare these impregnated catalysts. According to a preferred embodiment of the present invention, impregnation may be carried out with a solution of one or more compounds which are capable of generating a catalytic constituent by thermal or chemical treatment. Several non-limiting examples of catalyst generating compounds are ammonium molybdate, ammonium chromate, chromium oxalate, zinc carbonate, cobalt acetate, nickel nitrate, nickel chloride, chloroplatinic acid, platinum-tetramine chloride [$Pt(NH_3)_4$]$Cl_2H_2O$, ammonium platinum-chloride $(NH_4)_2$ [$PtCl_4$] and the like.

Impregnation of the alumina beads prepared as hereinabove described with the solution of catalyst generating compound may be performed either before drying or after drying and calcination of the beads. After impregnation, the beads are dried again and, if necessary, are calcined at a temperature of about 400° to 800°C, preferably 500° to 700°C. In some instances, it may be preferable to perform impregnation of alumina beads already dried and calcined, this method more readily permitting preparation of catalysts containing precise amounts of active catalytic constituent. When it is desired to prepare a catalyst containing several active constituents, co-imprenation may be performed with a solution of several catalyst generating compounds, or successive impregnations may be performed with different solutions, with drying and calcination, if necessary or desirable, between each impregnation.

The process of the present invention is very flexible and permits preparation of a wide variety of catalysts in which the amount of active catalytic constituent may be between very wide limits.

The following examples are presented for the purpose of illustrating the present invention and are not to be considered limiting. Except as otherwise stated, all indicated percentages are expressed by weight. Also, in the following examples, the mechanical resistance of the beads is expressed by the crushing resistance measured with a Tablet Hardness Tester apparatus (of Manestry Machines Ltd., Liverpool, Great-Britain) in which the bead is placed between two plates, one of which is fixed and the other is used for increasing weight upon the bead. The values given in the examples are the average values of experiments performed on five beads.

EXAMPLE 1

Alumina hydrogel was prepared by treating aluminium sulphate with caustic soda up to pH 9. The gel obtained was purified by several water washings and then dried at 110°C, crushed and sieved. With 6.1 g. of this alumina hydrogel (5 g. of $Al_2O_3$) were mixed 5 g. of a solution containing 5% by weight of acrylamide, 20% by weight of acrylic acid, 1.25% of dihydroxyethylene-bis-acrylamide, and 12.1 ml. of water. Ammonium persulphate (1.5 ml. of a 10% solution) was added with 0.5 ml. of a 5% solution of sodium bisulphite. The resulting mixture was added, dropwise, into a column containing a paraffinic oil (density $d_{15}^4$: 0.83) heated to 95°C. At the bottom of the column, beads were recovered in 0.5% aqueous solution of sodium dithionite. The beads were perfectly isolated and manipulable. Without using the sodium dithionite solution, the beads are tacky.

The recovered beads were dried at 110°C, then calcined at 700°C. These beads had an apparent density of 0.75 g./ml. and a crushing resistance of 4 kg.

EXAMPLE 2

An aqueous mixture was prepared having the composition: alumina hydrogel, 14.4% (based on $Al_2O_3$); acrylamide, 4.8%; dihydroxyethylene-bis-acrylamide, 0.24%; perchloric acid, 3.4%; ammonium persulphate, 0.57%; and sodium bisulphite, 0.057%. A part of this mixture was treated as in Example 1. The beads are recovered at the bottom of the column containing the oil. In another experiment, another part of this aqueous mixture was injected at the bottom of column containing Phenoclor DP4 (chlorinated diphenyl sold by PROGIL S. A., having a density of 1.39 at 100°C), this liquid being at a temperature of 95°C. The beads were recovered at the surface of the liquid. Thereafter, the beads were washed with water and aged in isopropanol for three hours before being dried at 110°C and calcined at 700°C. The apparent density of the alumina beads obtained in each of the experiments was 0.91 g/ml. and the crushing resistance was 10 kg.

EXAMPLE 3

A series of experiments were performed by using different aqueous mixtures containing 15% of alumina hydrogel (based on $Al_2O_3$) and variable amounts of acrylic acid, perchloric acid and catalyst. The amount of cross-linking agent (dihydroxyethylene-bis-acrylamide) was equal to 5% of the acrylic acid weight. The catalyst consisted of ammonium persulphate and sodium bisulphite in a weight ratio of 10 : 1. The alumina beads were formed by passage through the column containing hot oil, dried and calcined. These beads had the characteristics indicated in Table I.

TABLE 1

| Acrylic Acid (% by weight) | Perchloric Acid (% by weight) | Catalytic mixture % by weight | Characteristics of beads apparent density | crushing resistance (kg) |
|---|---|---|---|---|
| 0.5 | 1.0 | 0.5 | 0.86 | 11.6 |
| 0.5 | 1.7 | 0.6 | 0.75 | 8.5 |
| 1.0 | 1.7 | 0.7 | 0.74 | 9.0 |
| 17.5 | 3.6 | 0.1 | 0.85 | 7.0 |
| 5.3 | 3.5 | 0.06 | 0.81 | 10.2 |

EXAMPLE 4

An aqueous mixture was prepared having the composition alumina hydrogel, 15.5% (based on $Al_2O_3$); acrylic acid, 0.51%; dihydroxyethylene-bis-acrylamide, 0.025%; $HClO_4$, 0.55%; HCl, 0.30%; ammonium persulphate, 0.38%; and sodium bisulphite, 0.038%. The aqueous mixture was then formed into beads as in Example 1. After drying and calcining, the alumina beads had an apparent density of 0.73 g./ml. and a crushing resistance of 9.1 kg.

EXAMPLE 5

An aqueous mixture was prepared and treated as in Example 4 but without a cross-linking agent. The characteristics of the alumina beads after calcination were an apparent density of 0.64 g/ml. and a crushing resistance of 8.7 kg.

EXAMPLE 6

An aqueous mixture was prepared having the composition: alumina hydrogel, 12.5% (based on $Al_2O_3$); acrylic acid, 4%; N,N'-ethylene-bis-acrylamide, 0.2%; para-toluenesulphonic acid, 2.47%; ammonium persulphate, 0.5%; and sodium bisulphite, 0.05%. The aqueous mixture was treated as described in Example 1. The characteristics of the alumina beads formed, after calcination, were an apparent density of 0.86 g/ml. and a crushing resistance of 3.25 kg.

EXAMPLE 7

An aqueous mixture was prepared having the composition: alumina hydrogel, 10.5% (based on $Al_2O_3$); methacrylic acid free of inhibitor, 7.5%; dihydroxyethylene-bis-acrylamide, 0.375%; perchloric acid, 2%; ammonium persulphate, 0.7%; and sodium bisulphite, 0.07%. The aqueous mixture was injected, dropwise, into a column containing oil heated at 102°C. After drying and calcining, the beads had an apparent density of 0.73 g/ml.

EXAMPLE 8

An aqueous mixture was prepared having the composition: alumina hydrogel, 20% (based on $Al_2O_3$); N-hydroxymethyleneacrylamide, 3.8%; dihydroxymethylene-bis-acrylamide, 0.19%; perchloric acid, 3.0%; ammonium persulphate, 0.6%; and sodium bisulphite, 0.06%. The aqueous mixture was allowed to flow, dropwise, into a column containing oil heated at 92°C. The beads obtained were washed with water, dried and calcined. The characteristics of the calcined beads were an apparent density of 0.90 g/ml. and a crushing resistance of 4.9 kg.

EXAMPLE 9

An aqueous mixture was prepared having the composition: alumina hydrogel, 14.15% (based on $Al_2O_3$; acrylamide, 5%; glyoxal, 0.27%; ammonium persulphate, 0.5%; and sodium bisulphite, 0.05%. This aqueous mixture was injected, dropwise, through a column containing oil heated at 99°C. The beads were recovered at the bottom of the column, washed with water, dried at 200°C and calcined at 500°C. The calcined beads had an apparent density of 0.57 g/ml.

EXAMPLE 10

Example 9 was substantially repeated except that formaldehyde (0.59% by weight in the aqueous mixture) was used instead of glyoxal. The calcined beads had an apprent density of 0.64 g/ml.

EXAMPLE 11

An aqueous mixture was prepared having the composition: alumina hydrogel, 10% (based on $Al_2O_3$); acrylic acid, 1.5%; ammonium persulphate, 0.27%; and sodium bisulphite, 0.027%. This aqueous mixture was injected, dropwise, through a column containing oil heated at 95°C. The recovered beads were manipulable and relatively elastic but not very resistant. The beads were aged in isopropanol and thereafter calcined at 700°C. The beads obtained after calcination had an apparent density of 0.48 gr/ml, and an average crushing resistance of 1 kg.

EXAMPLE 12

An aqueous mixture was prepared having the composition: alumina hydrogel, 15% (based on $Al_2O_3$); acrylic acid, 0.52%; acrylonitrile, 0.48%; dihydroxyethylene-bis-acrylamide, 0.05%; perchloric acid, 1.8%; ammonium persulphate, 0.6%; and sodium bisulphite, 0.06%. The aqueous mixture was injected, dropwise, through a column containing oil heated at 95°C. The beads obtained after calcination, had an apparent density of 0.87 g/ml., and a crushing resistance of 10.9 kg.

EXAMPLE 13

An aqueous mixture was prepared having the composition: alumina hydrogel, 10% (based on $Al_2O_3$); acrylic acid, 4%; dihydroxyethylene-bis-acrylamide, 0.2%; perchloric acid, 10%; ammonium persulphate, 0.45%; and sodium bisulphite, 0.045%. The aqueous mixture was injected, dropwise, through a column containing oil heated at 95°C. The beads obtained, after calcination, had an apparent density of 0.75 g/ml.

EXAMPLE 14

An aqueous mixture was prepared having the composition: alumina hydrogel, 9.5% (based on $Al_2O_3$); sodium silicate, 0.5% (based on $SiO_2$); perchloric acid, 3.9%; acrylic acid, 2%; dihydroxyethylene-bis-acrylamide, 0.1%; ammonium persulphate, 0.33%; and sodium bisulphite, 0.033%. The alumina hydrogel had been prepared by treating aluminium sulphate with caustic soda up to pH 9. The gel obtained had been purified with several waterwashings and then dried at 110°C, crushed and sieved. In preparing this mixture, sodium silicate was added, dropwise, to water and perchloric acid. Thereafter, dried alumina hydrogel and the other constituents were added. This aqueous mixture was injected, dropwise, through a column containing paraffinic oil (density $d_{15}^4$ : 0.83) heated at 95°C. The beads were recovered at the bottom of the column and were found to be stable and manipulatable. After washing, drying at 120°C and being subjected to a slow calcination up to 700°C, the beads obtained had a crushing resistance of 5.6 kg.

EXAMPLE 15

An aqueous mixture was prepared having the composition: alumina hydrogel, 10.55% (based on $Al_2O_3$); acrylic acid, 1%; dihydroxyethylene-bis-acrylamide, 0.05%; ammonium persulphate, 0.20%; and sodium bisulphite, 0.020%. This aqueous mixture was injected, dropwise, through a column containing oil heated at 95°C. A low pressure was applied. The beads obtained were aged in an ammonium solution and thereafter washed and dried. These beads were impregnated with a solution containing ammonium heptamolybdate and cobalt nitrate. Thereafter the beads were dried and calcined at 575°C. The catalyst obtained contained 3.84% cobalt oxide and 9.40% molybdenium oxide, the remainder being alumina, in the form of beads, 95% of which had an average diameter of between 1 and 2 mm. This catalyst is found to be useful for hydrorefining lubricating base oils.

EXAMPLE 16

An aqueous mixture was prepared having the composition: alumina hydrogel, 15.6% (based on $Al_2O_3$); perchloric acid, 3.6%; acrylic acid, 2.1%; N,N'-methylidene-bis-acrylamide, 0.25%; ammonium persulphate, 0.95%; and sodium bisulphite, 0.094%. This aqueous mixture was injected, dropwise, through a column containing oil heated at 95°C. The beads obtained were washed with water and dried. They were impregnated with a solution containing ammonium molybdate and cobalt nitrate, and thereafter calcined at 650°C. The resulting beads contained 3.08% by weight of CoO and 8.61% of $MoO_3$, the remainder being alumina. The average crushing resistance of the beads was 6.25 kg and the apparent density was 0.9 g/ml.

EXAMPLE 17

An aqueous mixture was prepared having the composition: alumina hydrogel, 15% (based on $Al_2O_3$); acrylic acid, 0.6%; acrylonitrile, 0.4%; dihydroxyethylene-bis-acrylamide, 0.05%; perchloric acid, 1.8%; ammonium persulphate, 0.6%; and sodium bisulphite, 0.06%. This aqueous mixture was injected, dropwise, through a column containing oil at 95°C. The beads obtained were dried and calcined and thereafter impregnated with zinc carbonate and chromium carbonate, and calcined again. The resulting catalyst, in the form of alumina beads, contained zinc oxide, ZnO, and chromium oxide, $Cr_2O_3$, in a ratio of ZnO to $Cr_2O_3$ of 1 : 1. This catalyst is found to be useful for preparing methanol from CO and $H_2$.

EXAMPLE 18

An aqueous mixture was prepared having the composition: alumina hydrogel, 15.6% (based on $Al_2O_3$); acrylic acid, 2.1%; perchloric acid, 3.6%; dihydroxyethylene-bis-acrylamide, 0.25%; ammonium persulphate, 0.94%; and sodium bisulphite, 0.094%. This aqueous mixture was injected, dropwise, through a column containing oil heated at 95°C. The beads were recovered, dried and calcined. Thereafter, they were impregnated with a solution containing ammonium chromate in order to obtain, after calcination, beads of catalyst consisting of $Al_2O_3$ containing 20% by weight of $Cr_2O_3$. Cyclohexane was dehydrogenated in the presence of this catalyst under a pressure of 20 atmospheres and at a temperature of 480°C. Benzene was obtained with a practically 100 percent yield.

EXAMPLE 19

An aqueous mixture was prepared having the composition: alumina hydrogel, 23% (based on $Al_2O_3$); acrylamide, 5.2%; glyoxal, 0.25%; perchloric acid, 3.6%; ammonium persulphate, 0.57%; and sodium bisulphite, 0.057%. The alumina hydrogel was obtained by hydrolyzing aluminium isopropylate and drying at 110°C. The aqueous mixture was treated as in Example 1. The spheres were recovered at the bottom of the column, washed with water, aged into isopropanol for 3 hours, dried at 110°C and calcined at 700°C. The resulting beads were dipped into a chloro-platinic acid solution, dried and calcined in order to obtain a catalyst in the form of beads containing 0.4% of platinum. This catalyst was found useful for catalytic reforming of naphtha at a temperature of 550°C and under a pressure of 3.5 kg/cm2. In such utility, the following results were obtained:

|  | Before reforming | After reforming |
|---|---|---|
| Boiling point (°C) | 130–195°C | 78–210°C |
| octane index (with 3 cm³ of tetraethyl lead) | 71 | 91 |

EXAMPLE 20

This example shows the use of a redox system consisting of $H_2O_2$ and $N_2H_2.2HCl$.

A gel (5.95 g.) obtained by hydrolyzing aluminium isopropylate and drying at 120°C, was mixed with 19.5 g. of water and with 0.9 ml. of perchloric acid at 70°C. After 15 minutes, the gel mixture was added to a mixture of 2 ml of a solution containing 60% of acrylic acid and 3% of a cross-linking agent consisting of acrylamide and glyoxal in a molar ratio of 2 : 1. To this was added 0.5 ml. of a 10% oxygenated water solution and 0.5 ml. of a 10% hydrazine chlorhydrate solution. The oil drop was carried out at 95°C and the recovered beads were waterwashed, dried at 120°C and calcined at 700°C. The apparent density of the beads was 0.72 g/ml and their crushing strength was 7.7 kg.

EXAMPLE 21

This example shows the use of another redox system which consists of $H_2O_2$.

A gel (252.85 g.) containing 20.9% water and obtained by hydrolyzing aluminium isopropylate and drying at 110°C was mixed with 6.67 g. of a 70% perchloric acid solution and with 893.75 g. of water. After 15 minutes, the gel mixture was admixed with 88.9 g. of a solution containing 60% of acrylic acid and 3% of a cross-linking agent consisting of glyoxal and acrylamide in a molar ratio of 1 : 2 and 31.1 ml. of a 10% oxygenated water solution. The oil drop was carried out at 96°C. The recovered beads were twice washed with chlorothene, three times with methanol and five times with distilled water. After drying at 110°C and calcining at 700°C, the beads had a crushing strength of 8 kg and an apparent density of 0.78 g/ml.

EXAMPLE 22

To 13.g. of boehmite or alumina hydrogel (product CONDEA SB 5233 sold by Petrochemie G.m.b.H of Hamburg, Germany) were mixed over a 30 minute period 79.5 g. of water and 1.1 ml. of concentrated nitric acid. To this was then added 3.3 ml. of a mixture containing 60% of acrylic acid and 3% of a reticulating agent consisting of acrylamide and glyoxal (molar ratio = 2:1). Finally, 1.7 ml. of a 5% solution of hydrogen peroxide and 0.85 ml. of a 1% solution of ascorbic acid were added. Beads were obtained by the oil drop (paraffinic oil at 95°C) and washed, dried and calcined. Such beads had a crushing resistance of 6 kg. and an apparent density of 0.79 g/ml.

EXAMPLE 23

Boehmite (CONDEA SB 5233) has been used for the preparation of a mixture containing: alumina hydrogel, 1.5% (based on $Al_2O_3$); perchloric acid, 3%; acrylic acid, 2%; acrylamide + glyoxal (molar ratio = 2:1), 0.01%; and $H_2O_2$, 0.75%. The beads obtained by oil drop were washed with distilled water, aged in a 5.6% ammoniac solution, dried and calcined. These beads had a crushing resistance of 7.5 kg., an apparent density of 0.81 g/ml. and a total porosity of 0.589 m./g.

What is claimed is:

1. A process for preparing alumina beads from alumina hydrogel comprising
  a. preparing an aqueous mixture containing from 5–30% by weight alumina in the form of alumina hydrogel and from 0.25–20% by weight of a water-soluble acrylic monomer which is polymerizable to an uncross-linked water-soluble polymer or an uncross-linked gel polymer, said acrylic monomer being of the formula

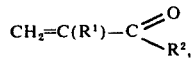

wherein $R^1$ is selected from a group consisting of —H and —$CH_3$ and $R^2$ is selected from the group consisting of —$OR^3$ and —$NR^3R^4$, wherein $R^3$ and $R^4$ are selected from the group consisting of —H and a hydrophylic radical,
  b. dispersing said aqueous mixture as droplets into a substantially water-immiscible fluid having a temperature of 50°–105°C. at atmospheric pressure to effect polymerization of said aqueous mixture,
  c. maintaining said droplets in said fluid until individual hard beads are formed, and
  d. drying and calcining said beads.

2. The process of claim 1 wherein $R^4$ is a hydroxyalkyl radical containing 1 to 2 carbon atoms.

3. The process of claim 1 wherein $R^4$ is a methoxymethyl radical.

4. The process of claim 1 wherein said aqueous mixture contains about 7.5 to 20% by weight of alumina hydrogel.

5. The process of claim 1 wherein alumina hydrogel contains a minor amount of silica or an alkali silicate.

6. The process of claim 1 wherein the amount of said monomer corresponds to about 5 to 150% of the alumina hydrogel by weight.

7. The process of claim 1 wherein said aqueous mixture contains additionally from 0.05 to 2% by weight of polymerization catalyst.

8. The process of claim 7 wherein said aqueous mixture contains additionally 0.5 to 10% of perchloric acid or para-toluenesulphonic acid and 0 to 1% of a cross-linking agent.

9. The process of claim 8 wherein perchloric acid is used in admixture with up to fifty percent, based on the amount of perchloric acid, of an acid selected from the group consisting of halogenated acids, nitric acid, phosphoric acid or aliphatic mono or dicarboxylic acid, substituted or unsubstituted and mixtures thereof.

10. The process of claim 1 wherein the polymerization of said aqueous mixture is performed by dispersing said aqueous mixture as droplets and by passing said droplets into a counter-current flow of a hot dry gas.

11. The process of claim 1 wherein said polymerization of said aqueous mixture is performed by introducing said aqueous mixture as droplets, at the bottom of a column containing a hot fluid having a density higher than that of the beads to be formed, and recovering said beads from the upper surface of said fluid.

12. The process of claim 1 wherein said polymerization of said aqueous mixture is performed by introducing said aqueous mixture as droplets into the head of a column containing a hot fluid having a density lower than that of the beads to be formed and recovering said beads at the bottom of said column.

13. The process of claim 1 wherein said water-soluble acrylic monomer is replaced by a minor amount of water-soluble monomer which is polymerizable to an uncross-linked water-insoluble polymer.

* * * * *